Patented Oct. 24, 1922.

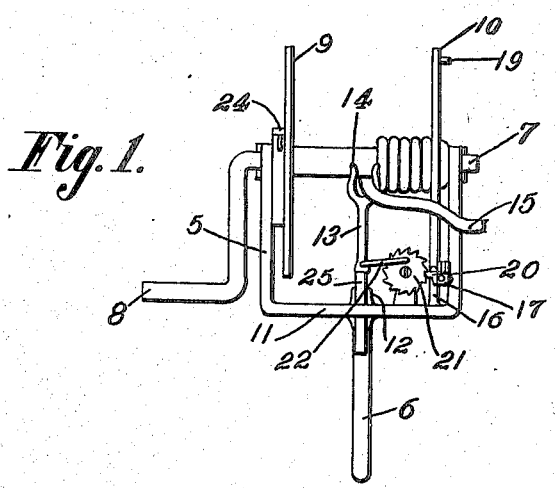
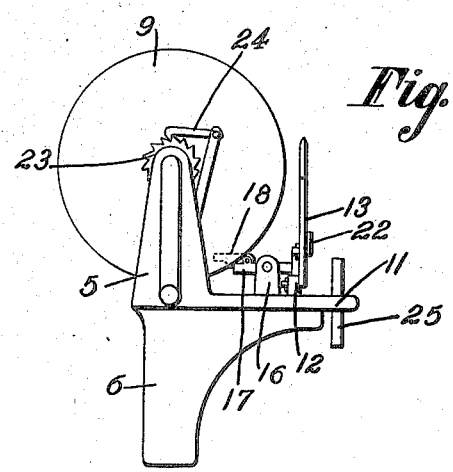
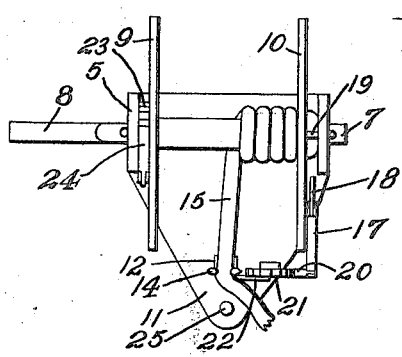

1,433,412

UNITED STATES PATENT OFFICE.

FRED O. PLAYLE, OF DAVENPORT, IOWA.

REEL.

Application filed February 28, 1921. Serial No. 448,586.

*To all whom it may concern:*

Be it known that I, FRED O. PLAYLE, a citizen of the United States, residing at Davenport, in the county of Scott and State of Iowa, have invented a new and useful Reel, of which the following is a specification.

This invention relates to winding and reeling, and more particularly to the construction of a reel especially designed for supporting clothes-lines or the like.

The primary object of the invention is to provide a device of this character having novel means for distributing the line being wound so that the same will be evenly positioned on the reel, to eliminate tangling thereof.

A further object of the invention is to provide means for restricting movement of the reel in one direction to insure against the reel operating in a reverse direction, when the operator releases the controlling handle of the reel.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a front elevational view of a device constructed in accordance with the present invention.

Figure 2 illustrates a side elevational view of the same.

Figure 3 illustrates a plan view thereof.

Referring to the drawing in detail, the reference character 5 designates a U-shaped support, which has connection with the bracket 6, and by means of which the U-shaped support 5 may be attached to any suitable support as a post or the like.

The U-shaped support 5 includes opposed bearing members in which is mounted the shaft 7 that forms the hub of the reel, the shaft being provided with a crank handle 8 extending beyond one of the sides of the U-shaped support, whereby the operator may rotate the drum to accomplish the winding and unwinding of the line.

Disks 9 and 10 respectively form a part of the reel, and are secured to the shaft 13 at points adjacent to the bearings of the U-shaped support, the disks providing the ends of the reel to prevent the line or material associated with the reel, from sliding or becoming displaced from the reel.

The base 11 forms a part of the support, and is provided with an upwardly extending lug 12 which is apertured to accommodate the lower right angled end of the guiding arm 13, to permit the guiding arm to rock with respect to the reel, and since this guiding arm is supported at a point intermediate the ends of the reel, it is obvious that the arm will have an unrestricted movement from one end of the reel to the other.

The upper end of the arm 13 is forked as at 14 to accommodate the line which is being wound on the reel, and which in the present drawing is indicated by the reference character 15, the movement of the arm 13 being timed with respect to the reel proper, so that the arm will guide the line evenly, to the reel, that is to say when the line is coiled around the shaft 7, the coils will be arranged in close engagement with each other throughout the length of the shaft.

Extending upwardly from the base 11, is an apertured ear 16 which provides a bearing for the arm 17 that has a pivoted end portion 18 that normally lies within the path of travel of the pin 19 which extends laterally from the disk 10, and since the arm 17 is pivoted at a point intermediate its ends, contact of the pin 19 with the pivoted end thereof, will cause the arm to rock in its bearing, with the result that the opposite end of the arm is moved upwardly.

Carried by one end of the arm 17 is a finger 20, which finger cooperates with the teeth formed in the wheel 21, that is pivotally supported by the base 11, so that movement of the arms 17 and finger 20 will result in movement of the wheel 21 a predetermined distance. A connecting rod 22 has one end thereof eccentrically connected to the wheel 21 while the opposite end thereof is positioned in a suitable opening provided in the guiding arm 13 which imparts reciprocatory movement to the guiding arm 13 upon movement of the wheel 21.

A ratchet wheel 23 has connection with the reel and cooperates with the pivoted pawl 24 which normally rests on the ratchet wheel 23, when the line is being wound on the reel, so that reverse movement of the reel during the winding operation is prevented, but it is to be understood that if it is desired to reverse the movement of the wheel, the pivoted pawl 24 may be swung upwardly out of the path of travel of the pin 19 to a position whereby the wheel is free to unwind.

Supported at the forward end of the body 11 is a peg 25 which may be employed to receive the line and relieve the wheel of the strain of the weight of the article supported on the line, the foregoing being accomplished by slightly twisting the line 15 around the peg 25, thus transferring the strain usually directed to the reel and its shaft to the body portion of the support.

Having thus described the invention, what is claimed as new is:—

A clothes-line reel comprising a support including spaced arms, a reel supported between the spaced arms and carrying a laterally extending pin, a pivoted arm mounted on the support, said arm carrying a finger, a wheel disposed adjacent to the finger and having teeth adapted to be engaged by the finger, a pivoted guiding arm having a forked end mounted on the support, a connecting rod connecting the guiding arm and the wheel, said rod being connected eccentrically to the wheel, to cause the rod to impart a reciprocating motion to the guiding arm when the wheel is rotated, and said wheel adapted to be revolved by the finger when the reel is operated.

In testimony that I claim the foregoing as my own, I have hereto affixed my signature in the presence of two witnesses.

FRED O. PLAYLE.

Witnesses:
G. R. COLEMAN,
C. E. KECKLER,